United States Patent [19]

van Os et al.

[11] Patent Number: 4,816,077

[45] Date of Patent: Mar. 28, 1989

[54] PROCESS FOR THE PREPARATION OF AN AQUEOUS SOLUTION OF A HETEROPOLYSACCHARIDE

[75] Inventors: George van Os, The Hague; Jan J. Bleeker, Amsterdam; Cornelis W. A. Schram, The Hague, all of Netherlands

[73] Assignee: Shell Oil Company, Houston, Tex.

[21] Appl. No.: 141,794

[22] Filed: Jan. 11, 1988

Related U.S. Application Data

[62] Division of Ser. No. 870,251, Jun. 3, 1986, Pat. No. 4,738,727.

[30] Foreign Application Priority Data

Jun. 6, 1985 [GB] United Kingdom ............... 8514315

[51] Int. Cl.4 .......................... C09K 3/00; C13K 1/00
[52] U.S. Cl. .................................. 127/29; 536/1.1; 435/105; 435/41; 252/8.551
[58] Field of Search ...................... 127/30, 29; 435/41, 435/104, 105; 536/1.1, 123, 124; 252/8.551

[56] References Cited

U.S. PATENT DOCUMENTS

| 4,299,825 | 1/1981 | Lee | 435/104 |
| 4,416,990 | 11/1983 | Rinaudo | 435/104 |
| 4,440,225 | 4/1984 | Holzwarth | 435/104 |
| 4,493,774 | 1/1985 | Bragg | 252/8.55 |
| 4,634,667 | 1/1987 | Linton et al. | 435/101 |

FOREIGN PATENT DOCUMENTS

1587225 4/1981 United Kingdom .

*Primary Examiner*—H. M. S. Sneed
*Assistant Examiner*—Chung K. Pak

[57] ABSTRACT

An aqueous solution of a heteropolysaccharide comprising glucose, galactose, pyruvic and succinic acid, is prepared by mixing a concentrate of said heteropolysaccharide with a saline aqueous medium containing from 12 to 30% w of at least one salt, and by shearing the mixture obtained.

7 Claims, No Drawings

PROCESS FOR THE PREPARATION OF AN AQUEOUS SOLUTION OF A HETEROPOLYSACCHARIDE

This is a division of application Ser. No. 870,251 filed June 3, 1986, now U.S. Pat. No. 4,738,727.

The present invention relates to a process for the preparation of an aqueous solution of a heteropolysaccharide and the use of such a solution in the production of oil from an underground oil-containing reservoir.

The injection of water to recover oil from underground oil-containing reservoirs is well known in the art. It is also known that the use of a viscosity-increasing agent in the injected water may improve the oil recovery. Some known viscosity-increasing agents are polyacrylamides, copolymers of acrylamides and acrylates, and polysaccharides, i.e. the product obtained from the cultivation of certain bacteria. Polyacrylamides show a viscosity loss in brines and are severely sensitive to shear. Since polysaccharides are relatively shear stable and show little viscosity loss in brines, they are preferred viscosity-increasing agents. They can be used in a viscosified aqueous drive fluid, but they can also be employed in drilling fluids, well completion fluids etc.

Generally, the cultivation of the bacteria is not carried out at the same place as where the polysaccharide is used. In order to reduce transportation costs the polysaccharide is delivered to the place where it is to be used in the form of a concentrate. The concentrate is then diluted with any aqueous medium which is available at this place, yielding a viscous aqueous solution. Aqueous media available at oil fields can be sea water, e.g. at off-shore facilities, and brines emanating from underground reservoirs. Latter brines can have a very high salinity. From British patent specification No. 1,587,225 it is known that when xanthan gum, i.e. the product obtained from the cultivation of Xanthomonas bacteria, generally containing mannose, glucose, glucuronic acid and pyruvic acid is used as the polysaccharide type viscosity-increasing agent, plugging occurs in the underground tests. This plugging is thought to result i.a. from precipitation of polymeric salts which occurs when solutions containing multivalent cations are injected into the reservoir. This is in agreement with the Applicant's experience that concentrates of xanthan gum when diluted with a saline, multivalent cation-containing aqueous medium, yield unclear solutions which plug the filters used in filterability tests.

It has now surprisingly been found possible to prepare from concentrates of certain heteropolysaccharides and highly saline aqueous media, dilute solutions having useful viscosity characteristics whilst also exhibiting excellent filterability.

The present invention therefore provides a process for the preparation of an aqueous solution of a heteropolysaccharide comprising glucose, galactose, pyruvic and succinic acid, in which process a concentrate of said heteropolysaccharide is mixed with a saline aqueous medium containing from 12 to 30%w of at least one salt, and the mixture obtained is sheared. The percentages are based on the total of water and salt(s).

Suitable heteropolysaccharides comprise glucose and for each 7 moles of glucose 0.9-1.2 moles of galactose and 0.65 to 1.1 moles of pyruvic acid and up to 2 moles of succinic acid, optionally in combination with acetic acid. Preferably the heteropolysaccharides are obtained from cultivation of Pseudomonas-type bacteria, in particular Pseudomonas sp. NCIB 11264 (e.g. as described in UK Patent Specification No. 1,539,064), Pseudomonas sp. NCIB 11592 (e.g. as described in EP-A-No. 40 445) or microorganism NCIB 11883 (e.g. as described in EP-A-No. 138 255) or mutants thereof. However, cultivation products of other bacteria, such as Rhizobium or Agrobacterium bacteria, are suitable as well.

The feedstock of the present process is a concentrate. This concentrate is usually such that it can be poured into and out of drums in which it is transported to the oil fields. The heteropolysaccharide concentrate is preferably an aqueous concentrate containing 4 to 15%w of said heteropolysaccharide. These concentrations ensure that on the one hand the feedstock is sufficiently concentrated to avoid unnecessary transportation costs whereas on the other hand it is readily dilutable in an aqueous medium.

Brine or sea water used as saline aqueous medium with which the concentrate is diluted, generally contains several salts. Usually alkali metal salts, such as sodium and potassium salts are present, together with alkaline earth metal salts such as calcium and magnesium salts. The aqueous medium may further contain minor amounts of other polyvalent metal ions as will be recognised by a person skilled in the art. The pH of the saline aqueous medium is not critical. Both acidic and alkaline media may be employed.

The preparation of the diluted heteropolysaccharide solution can be carried out batchwise. Thereto, a concentrate is fed into a tank, the saline aqueous medium is fed therein, too, in the required quantity, and with a mixing device the admixture is mixed under shearing. Preferably, the concentrate and the saline aqueous medium are mixed and sheared in a continuous manner. Thereto, the concentrate and the saline aqueous medium are introduced into an in line wet comminution machine. In such a machine a great amount of energy is imparted to the concentrate and the aqueous medium through forces of impact and hydraulic shear. Such machines usually comprise a rotor and a stator. The degree of particle breakdown can be controlled by regulating the gap between the rotor and the stator which are present in such comminution machines. The present invention is not limited to any type of comminution machines. Many types, including machines for batch processes, can be used in the present process. The concentrate and saline aqueous medium are preferably mixed and sheared at a temperature ranging from 20° to 100° C., at a pressure in the range $1 \times 10^5$ to $15 \times 10^5$ Pa, at a shear rate of 10,000 to 200,000 $s^{-1}$ and at a power input of 0.5 to 10 kWh/m$^3$.

The extent of dilution can be set at any desired level. The concentration of the solution is generally selected in dependency on the desired viscosity. Preferably, the viscosity of the solution obtained after shearing ranges from 2 to 400 mPa.s, in particular from 5 to 100 mPa.s (at a shearing rate of 7.5 $s^{-1}$ and at 30° C.). The solution suitably contains from 100 to 2000 ppmw of heteropolysaccharide. The present process will be elucidated by means of the following Examples.

EXAMPLES

Two heteropolysaccharides were tested, heteropolysaccharide I being a 7.7%w concentrate of a Pseudomonas NCIB 11592 heteropolysaccharide (as described in EP-A-No. 40 445) containing glucose, galactose, pyruvic acid and succinic acid, and heteropolysaccharide II being a 7.8%w xanthan gum concentrate derived from Xanthomonas campestris NCIB 11854 (as described in EP-A-No. 130 647). These concentrates were mixed with one of two brines, brine A comprising 15%w of NaCl and 1.5%w of $CaCl_2$ in water, and brine B comprising 25%w of NaCl, 2.5%w of $CaCl_2$ and 2%w of $MgCl_2$ in water, the weight percentages being based on the total of salts and water.

Example I

A series of tests were run using a colloid mill with a slit width of 0.008 ft (2.44 mm), at a shearing rate of 100,000 $s^{-1}$, a throughput of 0.23 l/s and a power input of 1.86 kWh/m³ per pass through the colloid mill. The concentrates were mixed with the amount of brine to achieve a suitable concentration for the mixture and passed 5 times through the colloid mill. After the second and following passes the filterability (Fi) and viscosity of the mixture were determined. The filterability is expressed as the time in seconds in which a liter of the solution is passed through a 1.2 μm filter at 40 psig (2.44×10⁵ Pa) pressure difference and at 30° C. The viscosity is measured at 30° C. and at a shearing rate of 7.5 $s^{-1}$.

Results of the tests are shown in Table I.

TABLE I

| Heteropoly saccharide | Brine | Concentration ppmw | Pass | Fi s | η mPa.s | Power input kWh/m³ |
|---|---|---|---|---|---|---|
| I | A | 375 | 2 | 113 | 21.7 | 3.72 |
|   |   |     | 3 | 93  | 21.6 | 5.58 |
|   |   |     | 4 | 101 | 21.7 | 7.44 |
|   |   |     | 5 | 92  | 21.7 | 9.30 |
| I | B | 250 | 2 | 244 | 10.2 | 3.72 |
|   |   |     | 3 | 212 | 10.3 | 5.58 |
|   |   |     | 4 | 198 | 10.4 | 7.44 |
|   |   |     | 5 | 203 | 10.3 | 9.30 |
| II | A | 400 | 2 | blocking | — | 3.72 |
|    |   |     | 3 | " | — | 5.58 |
|    |   |     | 4 | " | — | 7.44 |
|    |   |     | 5 | " | 19.6 | 9.30 |
| II | B | 250 | 2 | blocking | — | 3.72 |
|    |   |     | 3 | " | — | 5.58 |
|    |   |     | 4 | " | — | 7.44 |
|    |   |     | 5 | " | 9.8 | 9.30 |

Example II

A second series of experiments were run using a static high shear mixer (Ultra torrax TP 45/4 G). A concentrate and a brine were mixed and subjected to shear at a shearing rate of 100,000 $s^{-1}$ for a number of seconds. Periodically the filterability and viscosity, as defined in Example I, were determined. The experimental data are indicated in Table II.

TABLE II

| Heteropoly saccharide | Brine | Concentration ppmw | Shearing time, s | Fi s | mPa.s | Power input kWh/m³ |
|---|---|---|---|---|---|---|
| I | A | 375 | 15 | 77 | 21.5 | 1.36 |
|   |   |     | 30 | 66 | 20.2 | 2.72 |
|   |   |     | 60 | 55 | 19.0 | 5.44 |
|   |   |     | 90 | 50 | 17.4 | 8.16 |
|   |   |     | 120 | 49 | 16.8 | 10.88 |
| I | B | 250 | 15 | 75 | 10.6 | 1.36 |
|   |   |     | 30 | 67 | 11.0 | 2.72 |
|   |   |     | 60 | 52 | 10.3 | 5.44 |
|   |   |     | 180 | 38 | 9.3 | 16.32 |
| II | A | 430 | 30 | blocking/40 g* | 25.5 | 2.72 |
|    |   |     | 60 | blocking/100 g | 26.0 | 5.44 |
|    |   |     | 120 | blocking/300 g | 25.4 | 10.88 |
| II | B | 240 | 60 | blocking/70 g | 9.6 | 5.44 |
|    |   |     | 120 | blocking/230 g | 9.0 | 10.88 |
|    |   |     | 180 | blocking/900 g | 8.2 | 16.32 |

*The number of grams shown indicates the amount of solution which passed through the filter before blocking occurred.

Example III

In an experiment brine B and concentrate of heteropolysaccharide I were supplied to an in line wet comminution machine (Dispax 3-6/6) in such quantities that the resulting mixture contained 250 ppmw of heteropolysaccharide. The machine was operated at a shearing rate of 43,000 $s^{-1}$, a throughput of 1.6 m³/h and a power input of 1.18 kWh/m³. After one pass the filterability of the solution was 75 s/l and the viscosity was 11.0 mPa.s at 7.5 $s^{-1}$ and 30° C.

From the above Examples it is apparent that xanthan gum can hardly be dissolved in high salinity brines and no useful product is obtained thereby, whereas heteropolysaccharide I can easily be dissolved at a power input below 10 kWh/m³ yielding solutions with excellent filterability and viscosity properties. Use of an in line wet comminution machine yields effective solutions at the lowest power input.

We claim:

1. An aqueous solution of a heteropolysaccharide prepared by a process which comprises mixing an aqueous concentrate of a heteropolysaccharide, produced by cultivation of a Pseudomonas or microorganism bacteria NCIB 11883 and comprising glucose and for each 7 moles of glucose, 0.9-1.2 moles of galactose and 0.65 to 1.1 moles of pyruvic acid and containing succinic acid, with or without acetic acid with a saline aqueous medium containing 12 to 30% by weight of sodium chloride and calcium chloride with or without magnesium chloride, and then shearing the resulting mixture.

2. An aqueous solution of a heteropolysaccharide according to claim 1 where the heteropolysaccharide is obtained by cultivation of Pseudomonas sp NCIB 11264, Pseudomonas sp NCIB 11592 or microorganism NCIB 11883.

3. An aqueous solution of a heteropolysaccharide according to claim 1 wherein the aqueous concentrate contains 4 to 15% by weight of said heteropolysaccharide.

4. An aqueous solution of a heteropolysaccharide according to claim 1 wherein the concentrate and the saline aqueous medium are sheared at a temperature ranging from 20° to 100° C., at a pressure in the range of from $1\times10^5$ to $15\times10^5$ Pa, at a shear rate of from 10,000 to 200,000 $s^{-1}$ and at a power input of 0.5 to 10 kWh/m$^3$.

5. An aqueous solution of a heteropolysaccharide according to claim 1 wherein the solution contains from 100 to 2000 ppmw of heteropolysaccharide.

6. An aqueous solution of a heteropolysaccharide according to claim 2 wherein the heteropolysaccharide is obtained by cultivation with Psuedomonas sp NCIB 11592.

7. An aqueous solution of a heteropolysaccharide according to claim 6 wherein the solution contains from 100 to 2000 ppmw of heteropolysaccharide.

* * * * *